(12) United States Patent
Jeffery et al.

(10) Patent No.: US 9,235,652 B1
(45) Date of Patent: Jan. 12, 2016

(54) OPTIMIZING A DATA INTEGRATION PROCESS

(71) Applicant: Groupon, Inc., Chicago, IL (US)

(72) Inventors: Shawn Ryan Jeffery, Burlingame, CA (US); Nick Pendar, San Ramon, CA (US); Matt DeLand, San Francisco, CA (US); Liwen Sun, Berkeley, CA (US); Rajat Bhattacharjee, Mountain View, CA (US)

(73) Assignee: Groupon, Inc., Chicago, IL (US)

( * ) Notice: Subject to any disclaimer, the term of this patent is extended or adjusted under 35 U.S.C. 154(b) by 240 days.

(21) Appl. No.: 13/790,763

(22) Filed: Mar. 8, 2013

Related U.S. Application Data

(60) Provisional application No. 61/664,919, filed on Jun. 27, 2012.

(51) Int. Cl.
*G06F 7/00* (2006.01)
*G06F 17/30* (2006.01)

(52) U.S. Cl.
CPC ................................ *G06F 17/30958* (2013.01)

(58) Field of Classification Search
CPC ... G06F 17/30592; G06F 9/4436; G06N 5/02; G06N 5/025; G06Q 10/0639; G06Q 10/0637; G06Q 10/067; G06Q 10/0633; Y10S 707/99934
See application file for complete search history.

(56) References Cited

U.S. PATENT DOCUMENTS

| | | | | |
|---|---|---|---|---|
| 6,633,886 | B1 * | 10/2003 | Chong | 707/798 |
| 2003/0058798 | A1 * | 3/2003 | Fleischer et al. | 370/238 |
| 2004/0243660 | A1 * | 12/2004 | Chew et al. | 709/200 |
| 2007/0244876 | A1 * | 10/2007 | Jin et al. | 707/5 |
| 2009/0063515 | A1 * | 3/2009 | Bar-Or et al. | 707/100 |
| 2010/0034080 | A1 * | 2/2010 | Charzinski et al. | 370/221 |
| 2012/0084789 | A1 * | 4/2012 | Iorio | 718/105 |
| 2013/0030859 | A1 * | 1/2013 | Jung et al. | 705/7.26 |
| 2013/0290297 | A1 * | 10/2013 | Weyerhaeuser et al. | 707/717 |
| 2013/0290489 | A1 * | 10/2013 | Branson et al. | 709/219 |
| 2014/0081896 | A1 * | 3/2014 | Ranganathan et al. | 706/48 |

FOREIGN PATENT DOCUMENTS

AU    2007315924 B2 *  7/2012

OTHER PUBLICATIONS

Jeffery et al., "Arnold: Declarative Crowd-Machine Data Integration," CIDR 2013, 6th Biennial Conference on Innovative Data Systems Research (CIDR I3), 8 pages, (2013).

* cited by examiner

*Primary Examiner* — Augustine K Obisesan
(74) *Attorney, Agent, or Firm* — Alston & Bird LLP

(57) ABSTRACT

Embodiments of the present invention provide systems, methods and computer readable media for optimizing a data integration process. In embodiments, a system can be configured to represent the processing of a data record that includes attributes, and to use that representation to determine an optimal processing of that data record. In embodiments, the system represents the processing of a data record as an operator graph comprising nodes and edges, where each node is an operator node that represents an operator for implementing at least one logical operation on at least one of the attributes and each edge between a pair of nodes represents the movement of data between the nodes. In embodiments, each operator node includes one or more operator metrics (e.g. operator cost metrics and operator quality metrics). In embodiments, the system determines optimal processing of the data record by determining a best path within the operator graph.

28 Claims, 6 Drawing Sheets

| 140A | | | |
|---|---|---|---|
| 142 | 144 | 146 | 148 |
| Standard Consumer Name | Main Street Bar & Grill | 1.0 | 3 |
| Legal Name | Main Street Bar & Grill INC | 1.0 | 2 |
| Aliases | MSBG | 0.9 | 3 |
| Address | 123 Main Street | 0.9 | 4 |
| Neighborhood | Downtown | 1.0 | 1 |
| Locality | Chicago | 1.0 | 1 |
| Province | Illinois | 1.0 | 1 |
| Country | United States | 1.0 | 1 |
| Postal Code | 60606 | 1.0 | 1 |
| Lat/Lon | 41.8834, -87.6364 | 0.8 | 3 |
| Open Hours | MTWHF 0800,2000 S 800, 1700 N CC | 0.8 | 7 |
| Phone Number | 3125551212 | 0.9 | 5 |
| Website | http://www.msbg.com/ | 1.0 | 4 |
| Capacity | 57 | 0.7 | 17 |
| Category | Restaurant — 144A | 1.0 | 1 |
| SubCategory | Pub Food | 0.8 | 2 |
| Services Offered | | | |
| General Pricing | $$ | 0.6 | 4 |
| Reservations Needed/Recommen. | No | 0.8 | 2 |
| Menu link | http://www.msbg.com/menu.pdf | 0.9 | 15 |
| Alcohol Type | Full bar | 0.8 | 6 |
| Menu/Service Items | | | |
| Award Indicators | AAA Diamond | 0.9 | 15 |
| Licensed Photos | | | |
| Chain / Franchise Affiliation | None | 0.9 | 2 |
| Payments Accepted | Cash, Credit (Visa, MC, Amex, DC) | 0.7 | 6 |
| WiFi Availability | Yes | 0.7 | 2 |
| Outdoor Seating | Yes | 0.8 | 4 |
| Attire | Casual | 0.8 | 6 |
| Restaurant Type | Full Service | 0.8 | 5 |
| Restaurant Offerings | | | |
| Delivery Offerings | Carry Out Only | 0.8 | 4 |
| Special Preparations | Organic | 0.8 | 13 |
| Parking Availability | Free Lot, Street Parking | 0.7 | 7 |
| Happy Hour Specials | Yes, MTWHF 1600,1900 | 0.6 | 12 |
| Alcohol Menu Items / Classification | Craft Beer | 0.7 | 10 |
| Ingredient Certification | Organic | 0.7 | 13 |
| Environment Assessment | Bustling, Vibrant | 0.6 | 5 |
| Experiential Offerings | Craft Beer Tastings | 0.7 | 11 |
| Record Budget (cents) 152A | 200 | | |
| Record Cost (cents) 152B | 198 | | |
| Set Record Quality 152C | 0.85 | | |
| Calculated Record Quality 152D | 0.87 | | |

OPTIMIZING A DATA INTEGRATION PROCESS

CROSS-REFERENCE TO RELATED APPLICATIONS

This application claims the benefit of U.S. Provisional Application No. 61/664,919, filed Jun. 27, 2012 the entire contents of which are hereby incorporated by reference.

FIELD OF THE INVENTION

Embodiments of the invention relate, generally, to systems for integrating data from disparate sources and, in particular, to systems and methods for optimizing a data integration process.

BACKGROUND OF THE INVENTION

Databases abound in the age of the Internet. Many databases have as their origins data that originated elsewhere, in one or more other databases, for example. The original data may have existed in different formats, for different purposes, and with different standards and/or requirements for accuracy. Data integration is the process of taking multiple, disparate, heterogeneous, "dirty" data sources (i.e., containing less-accurate or even erroneous data, data of which the accuracy is not known, and/or data not optimally formatted) and combining them into a single, unified database known, to a desired degree, to be generally error-free and properly formatted. Sometimes, data integration is accomplished using multiple processing steps that iteratively clean and normalize the data. High-quality data integration often includes processing steps such as data collection, training machine-learning algorithms, cleaning up of "dirty" data, and verifying data. Cost, in terms of time and money, of the data integration process becomes a key consideration when the amount of data becomes large (e.g., millions or billions of input records). Through applied effort, ingenuity, and innovation, solutions to optimize the data integration process have been realized and are described in connection with embodiments of the present invention.

BRIEF SUMMARY OF THE INVENTION

In general, embodiments of the present invention provide herein systems, methods and computer readable media for optimizing a data integration process. In embodiments, a system can be configured to represent the processing, for data integration, of a data record that includes attributes, and to use that representation to determine an optimal processing of that data record. In some embodiments, the data record is a business data record that includes attributes such as business name, business location, business neighborhood, business category, business website, description of business services offered, and business promotions offered.

In embodiments, the system represents the processing of a data record as an operator graph comprising nodes and edges, where each node is an operator node that represents an operator for implementing at least one logical operation on at least one of the data record attributes and each edge between a pair of nodes represents the movement of data between the nodes. In embodiments, each operator node includes one or more operator metrics (e.g. operator cost metrics and operator quality metrics).

In embodiments, the system generates an optimized operator graph (e.g. a directed line graph or a directed acyclic graph) based on the operator graph. The optimized operator graph includes a source node (an operator node that receives the data record as input) and a sink node (an operator node that produces processed data as output). In embodiments, the system determines optimal processing of the data record by determining, using the operator metrics respectively associated with each of the operator nodes, a best path within the optimized operator graph from the source node to the sink node.

For example, in embodiments, the system receives a cost budget associated with a particular data record and, using operator metrics, determines a best path within an optimized operator graph associated with the particular data record. The determined best path is a path that produces maximum quality output at a calculated cost that is less than or equal to the received cost budget.

In some embodiments, the system orchestrates the processing of a particular data record based on the best path determined for that particular data record.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 depicts an example entity record that may be processed during data integration in accordance with some embodiments discussed herein;

DETAILED DESCRIPTION OF THE INVENTION

Figure 1:
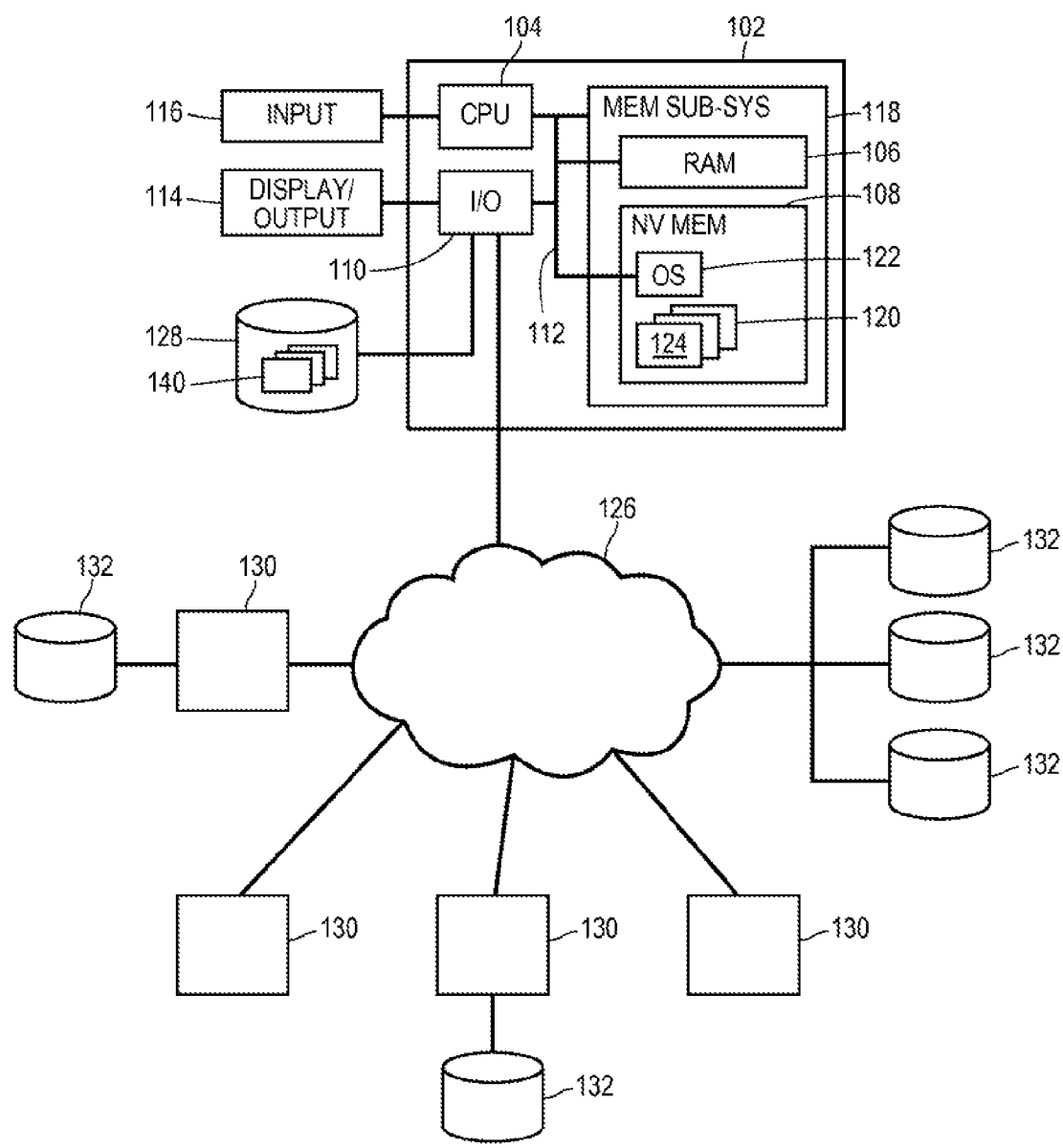
FIG. 1 illustrates an example system that can be configured to perform data integration in accordance with some embodiments discussed herein.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

A system and method for controlling a data integration process controls the acquisition, processing, and storage of data related to a variety of entities. The entities may generally be business entities, such as restaurants, bars, stores, services, hotels, spas, nail salons, or any other entity for which a record of information about the entity might be useful. Data for each entity may be stored in a corresponding record within a database of entity records. The raw data for the database of records may be collected from a variety of sources, including internet search engines, other databases, previously compiled information, manual collection and input, and the like. Regardless of the source of the data, the data are generally considered "dirty." That is, the data may be incorrect, be in the wrong format, include duplicates, be merged, concatenated, disjoined, etc. For this reason, the data are frequently subjected to a number of operations that serve to correct, adjust, formalize, normalize, etc., the data to create a database of integrated entity records. The process of data integration is defined herein as encompassing all operations related to the acquisition, processing, and storing of the records in the database, including, but not limited to: acquisition, conversion, formatting, normalization, geocoding, categorization, extraction, partitioning, scoring, matching, merging, and verification. The process of data integration is generally accomplished by a variety of operators, each of which may be human or machine, and each of which performs a particular one or ones of the data integration operations.

Multiple operators may be available to perform any one of the various operations. Some operators may be automated, computer algorithms, while other operators may employ crowd sourcing, and still other operators may be specialized human operators. As used herein, crowd sourcing is a process that involves outsourcing tasks to a distributed group of people via a computer interface to a crowd sourcing platform.

In any event, different operators available to perform a particular operation may output results of different quality generally, or may output results of different quality depending on the particular type of data, geographic region associated with the data, origin of the data, etc. For example, a particular operator for geocoding may have a higher relative quality (compared to a second operator) when the input value is an address in Europe, and a lower relative quality (compared to the second operator) when the input value is an address in the United States. As another example, one particular operator for normalizing an address may have relatively higher quality when normalizing addresses acquired from a first source, while another operator for normalizing an address may have a relatively higher quality when normalizing addresses acquired from a second source. That is, for any operation that may be performed by two or more operators, each operator may have associated with it a quality metric.

Additionally, each operator may have associated with it a cost in terms of time required to perform the operation, monetary cost of performing the operation, or both. For example, a first operator may cost $0.03 per operation, while a second operator may cost $0.50 per operation. As another example, a first operator may require 4 seconds per operation, while a second operator may require 25 seconds per operation. As still another example, the cost may be some calculated value taking into account both time required and cost for the operation (e.g., the operator cost may be calculated as the cost per operation in cents multiplied by the time required per operation in seconds). In any event, each operator may have associated with it one or more operator costs as described.

A data integration control system may optimize a data integration process by selecting, for each operation, one or more operators to perform the operation. In many cases, the selection of manual or crowd sourced human input may be preferable to automated operators, given no other constraints, because manual or crowd sourced input is sometimes more reliable than machine algorithms. However, the cost of manual or crowd sourced human input may make it too prohibitive to use for every operation on every record. Accordingly, the control system may implement various algorithms to determine, for each operation, which of the operators to select. The algorithms may select the operators according to one of a number of schema. For example, the algorithms may select the operators so as to maximize quality of a record/database within a given budget for the record/database, to minimize cost for a record/database while maintaining a minimal level of quality for the record/database, or some combination. One example system that optimizes a data integration process is the Arnold system, described, for example, in S. Jeffery, L. Sun, M. DeLand, N. Pendar, R. Barber, and A. Galdi, "Arnold: Declarative Crowd-Machine Data Integration," $6^{th}$ Biennial Conference on Innovative Data Systems Research (CIDR '13), January 2013.

FIG. 1 depicts a block diagram of an exemplary system 100 for performing data integration. The system 100 includes one or more workstations 102 for collecting and retrieving data, optimizing data integration, storing data, and communicating with objects outside of the workstation 102 as described below. For simplicity, FIG. 1 depicts only a single workstation 102, though any number of workstations 102 may participate in executing the data integration process. The workstation 102 includes a processor (CPU) 104, a Random Access Memory (RAM) 106, a non-volatile memory or program memory 108, an input/output (I/O) circuit 110, and a communication bus 112 communicatively coupling to one another the processor 104, the RAM 106, the program memory 108, and the I/O circuit 110. The workstation 102 may also include, or be communicatively coupled to, a display 114 and one or more input devices 116, such as a keyboard, a mouse, a trackpad and/or a touchpad, a touch-sensitive screen, a gesture tracking system, or any other known input method. Of course, the input device 116 may be separate from the display 114 or may include the display 114 (e.g., where the input device 116 is a touch-sensitive display).

The I/O circuit 110 couples the display 114 and the input devices 116 to the bus 112 in the workstation 102, which bus 112, in turn, communicatively couples the I/O circuit 110 to the processor 104 and a memory sub-system 118. The processor 104 may be any processor capable of executing one or more programs stored in the memory sub-system 118 (as described below) to perform the specific tasks associated with controlling and/or executing the data integration process herein described and, in particular, may be a general purpose processor, a digital signal processor, a field programmable gate array (FPGA), an application specific IC (ASIC), etc. Though described herein as a single processor, the processor 104 could be multiple processors in a single package, or multiple processors distributed across multiple workstations.

The processor 104 may operate to retrieve one or more applications 120 from the memory sub-system 118 and to execute the applications 120. An exemplary workstation 102 includes an operating system (OS) 122 such as Windows, Mac OS, Linux, Android, etc. The exemplary workstation 102 may also store in the memory sub-system 120 a software application 124 embodying the data integration control application. For simplicity, the term "software application" is used herein to refer both to an instance of a software application executing in the workstation 102 and to the set of computer instructions that defines the software application. However, it will be understood that while an instance of an application executes in the workstation 102, machine-readable instructions of the application are stored on a non-transitory, computer-readable medium such as the program memory 108, the RAM 106, or both. The program memory 108 may be a hard disk, a flash drive, a CD, a DVD, a tape drive, etc. In at least some of the embodiments, the program memory 108 is significantly slower that the RAM 106. In particular, the program memory 108 may have one or more of a slower read speed, a slower write speed, a lower bandwidth (i.e., the size of a data block the program memory 108 can supply to the CPU 104 at one time), etc.

The OS 122 executes on the processor 104 ("central processing unit" or "CPU") that includes one or several CPU cores, depending on the embodiment. In general, the RAM 106 may be provided on a same chip as the CPU 24 or on a separate chip. During operation, the RAM 106 operates as an active storage, so that software tasks such as the application 120 access memory pages (or simply "pages") stored in the RAM 106 quickly and efficiently.

The I/O circuit 110 may communicatively couple the processor 104 to a database 128 storing records 140 and other data collected for processing, as well as records 140 that have been processed according to the methods described herein. Additionally, the I/O circuit 110, which may include a network interface (not shown), may communicatively couple the processor 104 to a network 126, which may, in turn, be coupled to a plurality of other workstations 130 and/or databases 132. Of course, each of the workstations may be configured substantially similarly to the workstation 102, having a CPU, an I/O circuit, input and display/output devices, and a memory sub-system including RAM and non-volatile memory.

The applications 120 may be any applications, including applications for performing the data integration process and, in particular, may be applications that serve as "operators" to perform operations (e.g., scoring, matching, merging, etc.) on the records 140 stored, for example, in the database 128. Alternatively or additionally, the applications 120 may facilitate crowd sourcing and/or other human data input by allowing human operators to perform particular tasks related to the records (e.g., verifying information).

Of course, while the applications 120 are internal to the workstation 102, being stored in the memory 108 and executed by the processor 104, various operators are external to the workstation 102, in some embodiments. Specifically, the workstations 130 may each store and execute software for performing one or more operations on data, or may store and execute software for facilitating crowd sourcing operations by allowing human operators to perform particular tasks.

Alternatively or additionally, one or more of the workstations 130 may be communicatively coupled to a database 132 storing records from which data may be collected by one of the operators. As described above, the raw ("dirty") data from which the records are assembled may come from any number of sources, including other databases, web servers, and the like. The operators stored as applications 120 on the workstations 102 and/or stored and executed by the workstations 130 may retrieve or receive data from the databases 132 as part of the collection/acquisition of data for an entity.

The records and other data stored in the database 128 may include information about a variety of entities and, in particular, may include for each of the entities values for a series of attributes. That is, each record may include a variety of attribute types and corresponding attribute values. In some embodiments, each record may also include, for each attribute type, an attribute quality value and an attribute cost value. FIG. 2 depicts an exemplary entity record 140A of the entity records 140 stored in the database 128. The record 140A includes a plurality of entity attribute types 142 and, for each entity attribute type 142 a corresponding entity attribute value 144. In the record embodiment 140A depicted in FIG. 2, each entity attribute type 142 is additionally associated with an entity attribute quality value 146 and an entity attribute cost value 148.

The entity attribute types 142 may include any information type that is desired to be stored for a particular entity. For example, where the entity records 140 correspond to restaurants, the entity attribute types 142 may include, by way of example and without limitation: a consumer name, a legal name, aliases, an address, a neighborhood, a city, a state, a country, a postal code, a latitude/longitude coordinate pair, the hours of operation, a phone number, a website, a restaurant capacity, a category and/or sub-category, a listing of services offered, a general indication of restaurant price, an indication of whether reservations are accepted and/or recommended and/or required, a link to a menu, an indication of whether alcohol is available, a listing of awards, the types of payments accepted, whether outdoor seating is available, the attire required, delivery options, parking availability, etc. Corresponding entity attribute values 144 may include, for example: for category, that the entity is a restaurant; for sub-category, the type of food served at the restaurant (e.g., Japanese, Sushi, Mexican, Seafood, Vegan, American, French, etc.); for types of payments accepted, which credit cards are accepted (e.g., MasterCard, Visa, Diners Club, Discover, etc.); for attire required, whether the dress is casual, business casual, dressy, formal, etc.; for parking availability, whether there is a free lot, a pay lot, valet service, street parking, etc.

Of course, where the entity records 140 correspond to types of entities other than restaurants, the entity attribute types 142 may be entirely or partially different from those described above. The entity attribute types 142 may include services offered for some entities such as Spas or, for auto mechanics, the types of vehicles on which the mechanic works. In some embodiments, each entity record 140 includes a category entity attribute type 142A, and the remainder of the entity attribute types 142 are generally determined according to an entity attribute value 144A corresponding to the category entity attribute type 142A.

Further, in the embodiment depicted in FIG. 2, the record 140A includes record attribute types 150 and corresponding record attribute values 152. The record attribute type-value pairs record information including, for example, a record cost budget, a record cost (a current cost, updated as a record progresses through various operators), a record quality setting (which can be a minimum or a goal), and a calculated record quality. The entity record 140A includes record attribute values 152 for each of the record attribute types 150 and, in particular, includes: a record attribute value 152A indicating that the record budget is 200 cents (i.e., $2.00); a record attribute value 152B indicating that the record cost is 198 cents (i.e., $1.98, the sum of the entity attribute costs 148 for the record 140A); a record attribute value 152C indicating that the set record quality is 0.85 (0 being worst quality, and 1 being an ideal record); and a record attribute value 152D indicating that the calculated record quality (determined as described below) is 0.87. Of course, the values indicated in the record attributes 152A-152D are variable. As another example, the system 100 could be minimizing cost (but, in any event, not exceeding a specified budget) while maintaining a minimum record quality. In such an instance, the values of the record attributes 152A-152D might be: the record attribute value 152A indicating that the record budget is 200 cents (i.e., $2.00); the record attribute value 152B indicating that the record cost is 95 cents (i.e., $0.95); the record attribute value 152C indicating that the set record quality (i.e., a quality floor) is 0.55 (0 being worst quality, and 1 being an ideal record); and the record attribute value 152D indicating that the calculated record quality is 0.56.

The database 128 may also include data structures storing various other data related to the data integration process. In particular, in some embodiments quality metrics are weighted according to one or more parameters. For example, in various embodiments quality metrics for each record are weighted according to importance of the entity, quality metrics for each attribute type are weighted according to the importance of the attribute type, and/or quality metrics for each record are weighted according to a uniqueness parameter associated with the entity.

Figure 3:
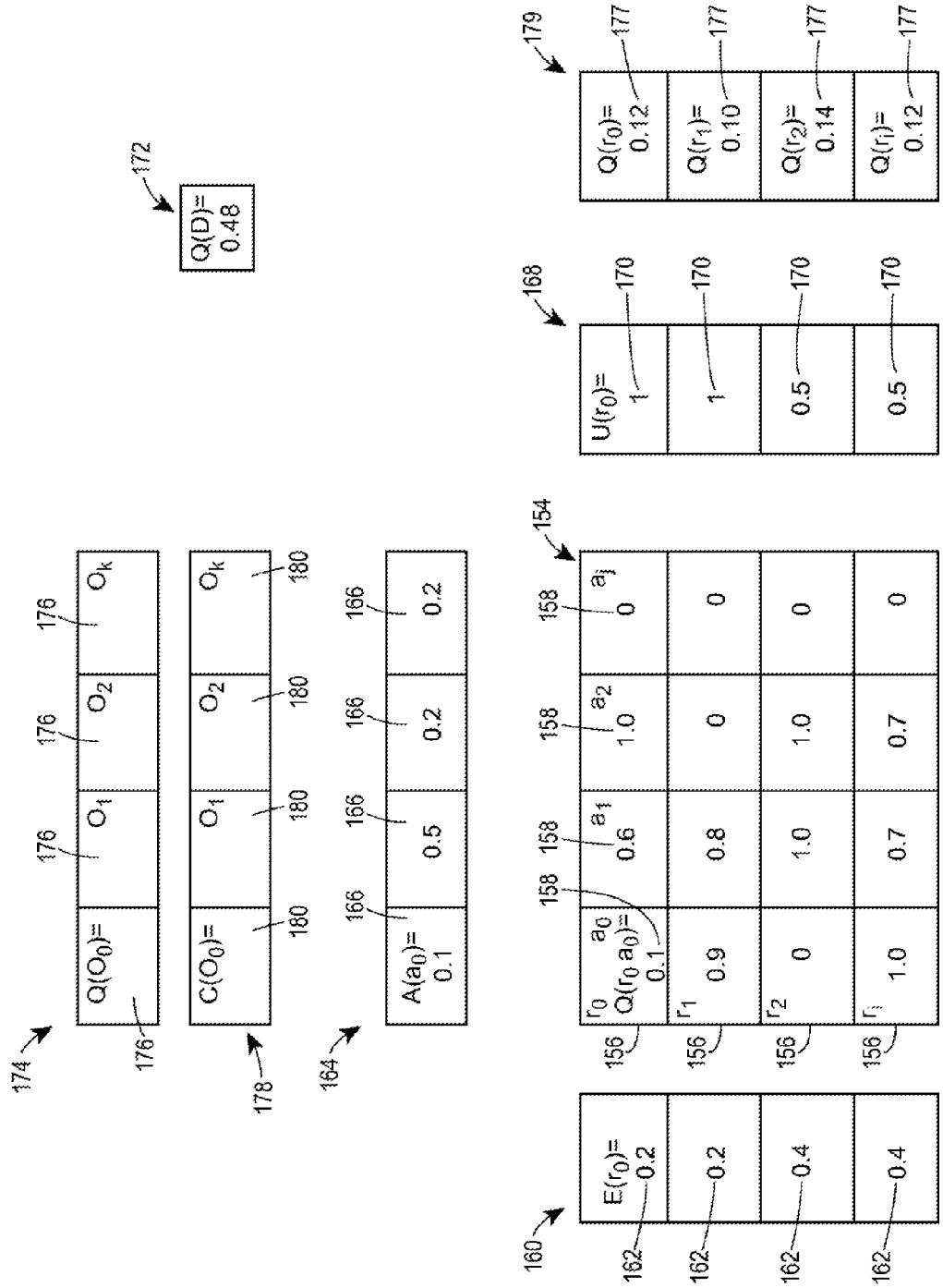
FIG. 3 illustrates a set of exemplary data structures storing various weighting parameters and quality data for controlling a data integration process in accordance with some embodiments discussed herein.

FIG. 3 depicts a set of exemplary data structures storing various weighting parameters and quality data for a particular embodiment. In the embodiment depicted in FIG. 3, the entity attribute qualities 146, described above as stored in the record 140A, are instead stored in a related data structure 154. Though depicted in FIG. 3 as a two-dimensional array of quality values, the data structure 154 could be any appropriate data structure type. In any event, the data structure 154 depicted is an array of records 156, $r_0$ through $r_i$, each having a corresponding array of entity attribute qualities 158, $Q(r_x a_y)$ for attributes $a_0$ through $a_j$.

A data structure 160 stores entity weights 162, $E(r_x)$, corresponding to each of the entities and records, $r_0$ through $r_i$. The entity weights designate the relative importance of the entity corresponding to the record $r_x$, and, accordingly, may serve to place a greater weight on quality for those entities. The importance of an entity may be determined in any meaningful way including, for instance, according to the frequency with which the entity appears in user queries or in query results; the monetary value of the entity to the business; the importance of the entity to a business or product-use case, etc. For example, entities in one locale (e.g., downtown) may have greater weights than another locale (e.g., suburbs), entities of one type (e.g., restaurants) may have greater weights than entities of another type (e.g., nail salons), entities of current clients may have greater weights than entities of non-clients, etc. Of course, the entity weights 162 may, alternatively, be stored as part of the records 140 and, in particular, as part of the record attribute types 150.

Similarly, a data structure 164 stores attribute weights 166, $A(a_y)$, corresponding to each of the attributes, $a_0$ through $a_j$. The attribute weights designate the relative importance of the attribute $a_y$ and, accordingly, may serve to place a greater weight on quality for particular attributes for which accurate information is particularly important. For example, accurate address information for an entity may be more important than accurate information about the entity's capacity or the availability of outdoor seating and, accordingly, greater weight may be placed on the address attribute by means of the values in the data structure 164. The relative weights assigned to each attribute in the data structure 164 may vary according to type of entity, according to location of the entity, according to the set of records, or according to any other criteria that could be useful. For this reason, in some embodiments there may be more than one data structure 164.

Likewise, a data structure 168 stores uniqueness weights 170, $U(r_x)$, corresponding to each of the records, $r_0$ through $r_i$. The uniqueness weights designate the relative number of occurrences of an entity (i.e., the duplication of the entity) associated with the record $r_x$. Uniqueness is determined as the inverse of the number of duplicates (i.e., $U(r_x)=1$ if there are no duplicates, 0.5 if there is one duplicate, 0.33 if there are two duplicates, etc.). In some embodiments, the entity weight 162 for an entity is distributed across the duplicated entities.

The data structures 154, 160, 164, 168 may, in some embodiments, be stored in the database 128. In alternate embodiments, the data structures 154, 160, 164, 168 may be stored in the non-volatile memory 108. Additional information may also be stored in the database 128 and/or in the memory 108. A database quality value, $Q(D)$ 172, may be stored to indicate the overall quality of the database, D, which may be calculated as described below. Additionally, data structures 174, 178 store operator quality $Q(O_w)$ and cost $C(O_w)$, respectively, for available operators $O_0$ through $O_k$. Still other data structures (not shown) may store data related to which operators are available and/or can be implemented to perform each of the particular operations.

Figure 4:
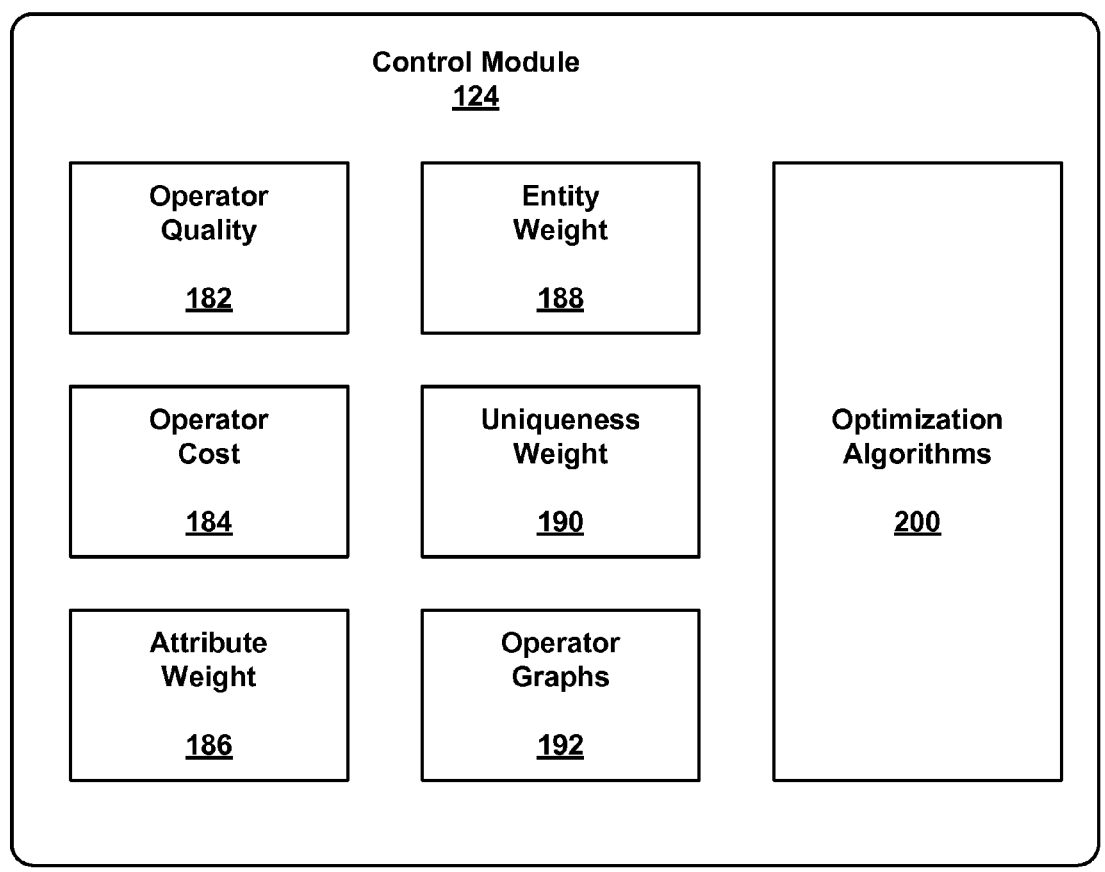
FIG. 4 is a block diagram of an exemplary control module that includes an optimization module in accordance with some embodiments discussed herein.

FIG. 4 is a block diagram illustrating the data integration and control application 124. The application 124 is generally responsible for optimizing the process of data integration. Optimization of the data integration process, as effected by the application 124 requires the selection, for each operation, of one or more operators to perform the operation. The application 124 may implement various algorithms to determine, for each operation, which of the operators to select. The algorithms may select the operators according to one of a number of schema. For example, the algorithms may select the operators so as to maximize quality of a record/database within a given budget for the record/database, to minimize cost for a record/database while maintaining a minimal level of quality for the record/database, or some combination.

The control module 124 may include a number of sub-modules for performing various tasks related to optimizing the process of data integration. In various embodiments, the control module 124 may include one or more of an operator quality module 182, an operator cost module 184, an attribute weight determination module 186, an entity weight determination module 188, a uniqueness determination module 190, an operator graph module 192, and an optimization module 200. While described herein as separate modules, the modules 182-200 may be independent modules or one or more of the modules 180-200 may be combined with others of the modules 182-200. Additionally, each of the modules may be implemented as software, stored on a computer readable medium and executed on a general purpose processor, such as the processor 104, or may be implemented as hardware, for example in an application specific integrated circuit (ASIC) or a field-programmable gate array (FPGA).

The operator quality module 182 is generally operable to determine, monitor, update, and store the quality of the operators performing operations on the records. The operator quality module 182 may implement one or more of a variety of methods for determining operator quality. Initially, the operator quality module 182 may determine the qualities of the various operators by sampling data output by the operator and asking an oracle (a trusted crowd operator which may include one crowd or multiple crowds) to rate the quality of the output data. Alternatively or additionally, the operator quality module 182 may compare the data output by the operator to corresponding data known to be of a high quality. In some embodiments, the data of a known quality could originate in a store of calibration data. Specifically, a set of "dirty" calibration data and a corresponding set of ideal calibration data may be used to determine or estimate operator quality by feeding the "dirty" calibration data into various operators and comparing the output data from each operator to the corresponding set of ideal calibration data to determine or estimate the relative quality of the operator. Alternatively, each operator could be assumed to have a quality of 0.5, and the estimated quality of each operator may be learned and/or adjusted in operation as described below. An operator that knows its own quality could also report and/or set its quality. If the quality reported by an operator is consistently incorrect, the operator quality module 182 may apply a correction factor to the quality reported by the operator. In any event, the operator quality module 182 stores the operator quality values in the data structure 174.

The operator quality module 182 may also periodically update the operator qualities stored in the data structure 174. In some embodiments, a sampling estimation algorithm is run after each operation. The sampling estimation algorithm may provide an output indicating whether or not an oracle should be consulted to review the output of the operation. The sampling estimation algorithm may consider, for example, the type and/or number of changes the operator made to the data, or may consider a distance between the input data and the data output by the operator. For example, with respect to a location, if an operator adjusts the location by a very small amount it may indicate that the operator is providing very high quality (precise) information. Alternatively, by way of example, an operator that makes a large change to a value (such as a large change to a location) may trigger the sampling estimation algorithm to indicate that an oracle is needed to review the data. Additionally, the sampling estimation algorithm may consider the output of multiple operators on the same data.

In some embodiments, the operator quality module 182 estimates operator quality using a mean quality score of a small set of samples selected from the output of an operator. The operator quality may be bounded by the standard error for the operator. The small set of samples is sent to the oracle. The records may be selected in any number of ways. By way of example and not limitation, the records sent to the oracle may be selected by random sampling (i.e., every record has a constant probability of being chosen). Alternatively, the operator quality module 182 may keep a window of size k samples out of n total records, and select new records to include in the sample with probability k/n, which allows the further reduction of samples sent to the oracle over time. In any event, the sampling of data output by an operator may be halted by when the error bound on the on the quality estimation drops below some threshold. Thereafter, the records may be periodically re-sampled to ensure the operator quality has not changed.

The operator cost module 184 is generally operable to determine or receive transaction cost information about individual operators, and to store the transaction cost information in the operator cost data structure 178. In some embodiments, the operator cost module 184 is operable to interface with a computer system of an operator to download and/or receive transaction cost information. For example, the operator cost module 184 may receive data from a crowd source web site such as Mechanical Turk,® providing updated transaction cost data based on consensus data. Alternatively or in addition, in some embodiments the operator cost module 184 may operate to determine the cost per transaction by analyzing data related to the number and types of searches requested and real-time (or even delayed) billing information. Still further, the operator cost module 184 may be operable to receive manually-input operator cost data. Of course, the operator cost information may vary according to the type of data on which an operation is performed (e.g., address data, phone number data, free-form data, etc.), according to the type of operation performed (e.g., collection, extraction, normalization, verification, etc.), according to the time of day, day of week, week of month, month of year, etc., according to the number of transactions requested in a given period of time (e.g., to implement price breaks above a certain number of transaction requests), according to the quality of the operator(s) available, etc.

The attribute weight determination module 186 is operable to determine the weight of each of the attributes for a given set of operations, and to store the attribute weights in the data structure 164. The attribute weight determination module 186 may calculate or otherwise determine attribute weights according to various algorithms as desired by the operator of the control system. In some embodiments, the attribute weight determination module 186 may retrieve from memory (e.g., from the memory 108) one of a plurality of attribute weight distributions according to the type or set of entities being processed. For example, if the entities are dine-in restaurants, the attribute weight determination module 186 may retrieve a first attribute weight distribution file in which the entity address, food type, and menu link are weighted heavily because those traits are important to that particular set of entities. If the entities are, by contrast, delivery restaurants, the attribute weight determination module 186 may retrieve a second attribute weight distribution file in which the entity phone number is weighted more heavily and the entity address is weighted less heavily (because customers presumably do not need an accurate address). In another example, the attribute weight determination module 186 may monitor which attributes are most requested and/or viewed by users of the data, and may select attribute weights accordingly, placing more weight on attributes viewed more frequently and less weight on attributes viewed less frequently. The attribute weight determination module 186 could also determine attribute weight distribution according to other factors such as locale and/or transit options. For example, for entities in urban areas with widespread public transportation options, the attribute weight determination module 186 may weight a "closest transit stop" attribute higher than a "parking availability" attribute, while the opposite may be true in urban areas lacking widespread public transportation.

Generally, the attribute weight determination module 186 may determine or retrieve attribute weights for a group of entities. However, it is also contemplated that attribute weights may be determined on an entity-by-entity basis in some embodiments. Additionally, while the attribute weight determination module 186 is described above as retrieving attribute weight distributions from memory, or determining or calculating the attribute weights, it is further contemplated that the attribute weight determination module 186 may receive and store user input specifying the weight of each attribute.

The entity weight determination module 188 operates to determine the weight of each of the entities, and to store the attribute weights in the data structure 160. The entity weight determination module 188 may calculate or otherwise determine entity weights according to various algorithms as desired by the operator of the control system. In some embodiments, the entity weight determination module 188 may retrieve from memory (e.g., from the memory 108) one of a plurality of entity weight distributions according to the type or set of entities being processed. In other embodiments, the entity weight determination module 188 may assign a particular entity weight to each entity according to various attributes of the entity. For example, the entity weight determination module 188 may assign relatively greater weight to entities in dense, urban areas and relatively lesser weight to entities in sparsely populated areas. As another example, the entity weight determination module 188 may assign relatively greater weight to entities having an established relationship with the system operator and may assign a relatively lesser weight to entities without a relationship to the system operator. As still another example, the entity weight determination module 188 may assign relatively greater weight to entities that occur more often in search results and relatively lesser weight to entities occurring less often in search results. Of course, the entity weight determination module 188 may also use other or different criteria to determine the entity weights.

Generally, the entity weight determination module 188 may determine or retrieve entity weights for each of a group of entities. However, while the entity weight determination module 188 is described above as retrieving entity weight distributions from memory, or determining or calculating the entity weights, it is further contemplated that the entity weight determination module 188 may receive and store user input specifying the weight of each entity.

The uniqueness determination module 190 operates to determine the uniqueness of each of the entities in a set of records, and to store the uniqueness weights in the data structure 168. The uniqueness determination module 190 may calculate or otherwise determine the uniqueness of each of the records according to various algorithms as desired by the operator of the control system. In some embodiments, the module 190 determines how many entities share the same value for the respective values of a "consumer name" attribute, and assigns a uniqueness weight to each that is equal to the inverse of the determined number of entities (e.g., if two entities share the same name, each entity is assigned a uniqueness weight of 0.5, if four entities share the same name, each entity is assigned a uniqueness weight of 0.25, etc.). The uniqueness determination module 190 may also make determinations of uniqueness according to other attributes, such as address or phone number, or may consider combinations of attributes when determining uniqueness. However, generally, the uniqueness weights are an estimation of the duplicate values that cannot be determined by automated means that are able to detect with some amount of certainty a duplicate entity. In determining uniqueness and assigning a uniqueness value for each entity equal to the inverse of the estimated number of records for the entity, the weight of the entity is effectively distributed across all of the perceived duplicates.

Generally, the uniqueness determination module 190 may determine or retrieve uniqueness values for each of a group of entities. However, while the uniqueness determination module 190 is described above as determining or calculating the uniqueness values, it is further contemplated that the uniqueness determination module 190 may receive and store user input specifying the uniqueness of each entity.

The control module 124 is also operable, by way of the operator graphs module 192, to construct operator graphs related to a record or a set of records being processed. An operator graph is a directed graph with multi-edges where each node, positioned between two edges of the graph, represents an operator. The space between the two edges represents a logical operation (i.e., what step(s) is/are being performed) while the node itself represents an operator performing the physical operation (i.e., how the step(s) is/are performed). The edges represent the movement of data from the output of one operator (i.e., node) to the input of the next operator (i.e. node). The operator graph has two special nodes, referred to as the source node and the sink node. A run of an operator graph G on a record R is a directed path in the operator graph, where the input to an operator is the output of the preceding operator in the path. The input to the source node is the record R. The output of the run is the processed record R, the output of the sink node.

In particular, the operator graphs module 192 may construct the node structure of the operator graphs, determining what logical operations to perform for a record or set of records. By way of example, and without limitation, the logical operations include:

collecting/acquiring—getting data for a single entity from wherever it resides (accomplished via web crawling, API pull, data dump, etc.);

parsing—taking raw text and converting it to a structured format with keys that are source-specific or standardized;

format normalizing—taking a structured record and converting it to a standard format (e.g., json, xml);

schema normalizing—converting source-specific keys into a common schema by, for example, simple key mapping;

value normalizing—applying value-specific rules to each value to clean/standardize the values (e.g., address standardization, phone number formatting, etc.)

geocoding—adding a latitude/longitude coordinate pair to a record;

categorizing—labeling the record with a category/subcategory;

extracting—extracting additional structured elements from a specific field with free-text;

partitioning—producing a candidate set of possibly matching places to the input record;

scoring—producing a "score" (0-1) denoting how similar records are, given two entities/records; there may be a large number of score (e.g., name score, address number score, geodistance score, category distance score, etc.) and scoring may include aggregating to collect individual scores to a master score for each pair of records;

matching—determining which entities/records are matches according to the determined scores;

merging—creating a single place by selecting/aggregating each field of the constituent entities/records given entities/records deemed to match; and verifying—checking an entity/record for inconsistencies.

The operator graphs module 192 may construct the node structure (i.e., determine which logical operations to include in a graph), in some embodiments, according to the type of entity, the types of attributes specified, and/or user input received from a declarative interface presented by the system 100. For instance, the system 100 may be programmed such that a specific set of attribute types and values is associated with entities of the type "restaurant." The system 100 may also be programmed such that each attribute type requires a corresponding specific set of logical operations. Thus, the operator graphs module 192 may construct a graph that specifies a set of operations to be performed for each of the attributes associated with a specified record type. Of course, while described individually, in some embodiments one or more of the logical operations may be performed in a single step and/or by a single physical operator. The operator graphs module 192 may construct a graph at runtime. In some embodiments, instead of specifying a graph, a user can specify, for each operator, the prerequisites for running that operator. Then, the operator graphs module 192 can choose dynamically which operator to run next by seeing which operators have fulfilled the prerequisites and quality and/or cost considerations described below.

Referring still to FIG. 4, the optimization module 200 operates to determine the edges of (i.e., the physical operators implemented in) the operator graph for a particular record or set of records, considering the budget and/or quality requirements for the record or set of records. In part, the optimization module 200 may calculate the current quality for a record, the current cost of a record, the current quality of a database, and/or the current cost of a database. With reference to FIG. 3, given the database, D, having the set of records $r_0$ to $r_i$, each having attributes $a_0$ to $a_j$, and data structures 160, 164, 168, storing weights for entities, attributes, and uniqueness, respectively:

The quality Q of a record $r_x$ may be calculated according to the equation:

$$Q(r_x) = \sum_{y=0}^{j} Q(r_x a_y) E(r_x) A(a_y) U(r_x) \quad \text{(Equation 1)}$$

where $E(r_x)$ is the entity weight corresponding to the record $r_x$, $U(r_x)$ is the uniqueness corresponding to the record $r_x$, and $A(a_y)$ is the attribute weight corresponding to the attribute $a_y$; and the quality Q of the database D may be calculated according to the equation:

$$Q(D) = \sum_{x=0}^{i} Q(r_x) \quad \text{(Equation 2)}$$

It should be understood that, in some embodiments, one or more of attribute weights, entity weights, or uniqueness values may be omitted and, therefore, the calculations of quality of a record and/or a set of records may be implemented accordingly. FIG. 3 illustrates the qualities 177 Q of the records $r_0$ through $r_i$ stored in a data structure 179, although the qualities 177 could also be stored as a value in each of the records $r_0$ through $r_i$ as illustrated in FIG. 2.

Figure 5:
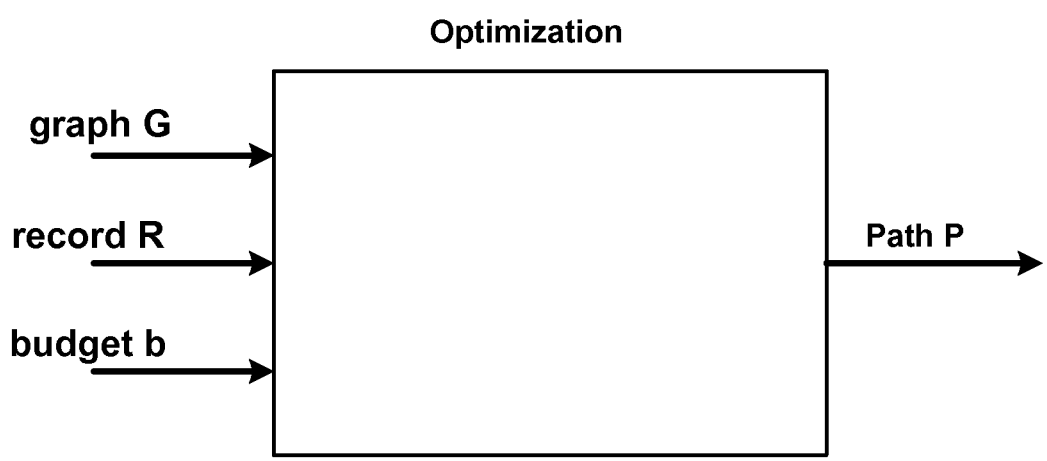
FIG. 5 illustrates the input and output flow of an optimization module in accordance with some embodiments discussed herein.

By implementing algorithms to optimize the data integration process, the optimization module 200 may select a path through an operator graph that maximizes quality within a budget ceiling, or minimizes budget without allowing quality to decrease below a minimum level. In the process, the optimization module 200 may select physical operators implementing human input for some logical operations but not for others, thereby efficiently involving manual or crowd-sourced input where it is most needed or has the biggest positive impact on quality. While the precise optimization algorithm employed may vary according to the specific embodiment, the inputs to the optimization algorithm are generally a graph (i.e., a set of logical operations to be performed), a record, a budget and, in some embodiments, a minimum quality, while the output of the optimization algorithm is generally a selected path, as illustrated in FIG. 5.

In embodiments, the optimization module 200 generates an optimized operator graph based on the operator graph. Depending on the form of the graph implemented in the optimization module 200, the optimization algorithm may vary. In a first implementation, the optimized graph is a line operator graph parameterized by n nodes and an ordered set, S, of attribute types. The ordered set is given by $$T:\{1, \ldots, n\} \to S.$$

The source node is node 1, and the sink node is node n. Edges are allowed only between node i and node i+1. Each edge is a multi-edge restricted in that corresponding operators of the edge must be of attribute type T[i]. Given the graph G, a record R, and a budget b, the objective is to choose a run path, P, of G on R such that the quality Q(P) of run P is maximized subject to keeping the cost C(P) of the run P less than or equal to the budget b.

There are two potential algorithms for finding the run P in the embodiment described above. One is to enumerate all of the paths, which includes offline analysis and a runtime choice of paths. The offline analysis has as inputs the graph G and the budget b, and outputs a hashmap H mapping budgets to paths. An exemplary implementation of the algorithm includes the following steps:

1. Initialize H to an empty hashmap.
2. Initialize Hq to an empty hashmap. // Hq maintains the best quality that can be achieved for a given budget.
3. For every path P in G between the source and the sink node, do the following:
4. Set Q=Q(P).
5. Set C=ceiling(C(P)).
6. If Q>Hq[C]:
7. Set Hq[C]=Q.
8. Set H[C]=P.
9. Set current_best_quality=0.
10. Set current_best_path=null.
11. For b in {0, . . . , B}:
12. If b not in H:
13. Set H[b]=current_best_path.
14. Set Hq[b]=current_best_quality.
15. Else:
16. Set current_best_path=H[b].
17. Set current_best_quality=Hq[b].

The runtime choice of paths receives as an input the hashmap H and the budget b, and outputs a path in G by returning the hashmap entry H[b].

Another potential algorithm for finding the run P in the embodiment described above uses dynamic programming, which also includes offline analysis and a runtime choice of paths. The offline analysis has as inputs the graph G and the budget b, and outputs a two-dimensional array P mapping budgets to paths. An exemplary implementation of the algorithm includes the following steps:

---

1. Initialize P as a two-dimensional array.    // P will contain the optimal path.
2. Initialize Z as a two-dimensional array.    // Z will contain the optimal quality.
3. Set n = number_nodes(G).
4. For b in {0, 1, . . . , B}:
5.    Set Z[n][b] = 0.
6.    Set P[n][b] = [ ].
7. For i in {n − 1, n − 2, . . . , 1}:
8.    For b in {0, 1, . . . , B}:
9.      Set Z[i][b] = 0.

-continued

```
10.     For each edge E between node i and node i + 1:
11.         If b >= C(E) and Z[i + 1][b − C(E)] + Q(E) > Z[i][b]:
12.             Set Z[i][b] = Z[i + 1][b − C(E)] + Q(E).
13.             Set P[i][b] = E + P[i + 1][b − C(E)].
14. Return the array P[1].
```

The runtime choice of paths receives as an input the array P and the budget b and outputs a path in G by returning the path stored in the array element corresponding to b.

In a second implementation, the graph is a directed acyclic operator graph parameterized by a directed acyclic graph (with no multi-edges), D, where each edge represents an attribute type. The directed acyclic operator graph is the operator graph which has a directed edge if and only if D has the corresponding edge. The operator corresponding to an edge can only be of type t, where t is the type of the edge in D. Given the graph G, the record R, and a budget b, the objective is to choose a run, P, of G on R such that the quality Q(P) of run P is maximized subject to keeping the cost C(P) of the run P less than or equal to budget b.

Like the implementation of the directed line graph described above, there are two potential algorithms for finding the run P in this embodiment: enumeration of all of the paths, and dynamic programming. With regard to the former, the offline analysis has as inputs the graph G and the maximum allowed budget b, and outputs a hashmap H mapping budgets to paths. An exemplary implementation of the algorithm includes the following steps:

1. Initialize H to an empty hashmap.
2. Initialize Hq to an empty hashmap. // Hq maintains the best quality that can be achieved for a given budget.
3. For every path P in G between the source and the sink node, do the following:
4. Set Q=Q(P).
5. Set C=ceiling(C(P)).
6. If Q>Hq[C]:
7. Set Hq[C]=Q.
8. Set H[C]=P.
9. Set current_best_quality=0.
10. Set current_best_path=null.
11. For b in {0, . . . , B}:
12. If b not in H:
13. Set H[b]=current_best_path.
14. Set Hq[b]=current_best_quality.
15. Else:
16. Set current_best_path=H[b].
17. Set current_best_quality=Hq[b].

The runtime choice of paths receives as an input the hashmap H and the budget b, and outputs a path in G by returning the hashmap entry H[b].

Dynamic programming with the directed acyclic operator graph also includes offline analysis and a runtime choice of paths. The offline analysis has as inputs the graph G and the maximum allowed budget b, and outputs a two-dimensional array P mapping budgets to paths. An exemplary implementation of the algorithm includes the following steps:

```
1. Initialize P as a two-dimensional array.    // P will contain the optimal path.
2. Initialize Z as a two-dimensional array.    // Z will contain the optimal quality.
3. Set n = number_nodes(G).
4. Set {1, . . . , n} as topological_sort(G).  // This flattens the graph G
5. For b in {0, 1, . . . , B}:
6.     Set Z[n][b] = 0.
7.     Set P[n][b] = [ ].
8. For i in {n − 1, n − 2, . . . , 1}:
9.     For b in {0, 1, . . . , B}:
10.        Set Z[i][b] = 0.
11.        For each edge E = (i, j) emanating from node i:
12.            If b >= C(E) and Z[j][b − C(E)] + Q(E) > Z[i][b]:
13.                Set Z[i][b] = Z[j][b − C(E)] + Q(E).
14.                Set P[i][b] = E + P[j][b − C(E)].
15. Return the array P[1]
```

The runtime choice of paths receives as an input the array P and the budget b and outputs a path in G by returning the path stored in the array element corresponding to b.

In additional embodiments, the same algorithms are used but, after each node, the budget is updated and the optimal path recomputed by either the path enumeration or dynamic programming approaches.

For a given graph and budget, the optimization module 200 outputs a path P specifying for each logical operation a physical operator to perform the logical operation. The control module 124, or another module, may orchestrate the data integration process according to the path P. Specifically, the records 140 and/or the attribute values 144 within the records 140 may be passed to the various operators specified by the path P and the operators may return the records 140 and/or the attribute values 144 modified according to the operation performed, at which time the modified records 140 and/or attribute values 144 may be stored. The operator may be a separate process (e.g., one of the applications 120) executing on the processor 104, or may be a process executing on an external workstation or server (e.g., the workstation 130). Moreover, the operator may be one or more humans that receive the records 140 and/or the attribute values 144, and process the records 140 and/or the attribute values 144 to provide potentially modified data in return.

Passing the records and/or attribute values to an operator may include causing the processor 104 to transmit a request to an external operator (e.g., executing on the workstation 130) and to receive from the external operator a response including the data processed by the operator. Where the operator is a crowd sourcing operator, the records or attribute values may be distributed to various human operators via a computer interface. That is, a crowd source resource (i.e., a person participating in the crowd sourcing) may receive the data through a user interface and may perform a task (i.e., the operation or a part of the operation) on the data via the user interface. When the task is complete, the data are transmitted back to the crowd sourcing operator, which forwards the data back to the processor 104.

The data output of each operator is passed to the next operator in the path P. In some embodiments, the data output from an operator is passed directly to the next operator in the path P, while in other embodiments, the data output from the operator is passed back to the processor 104 and, in turn, transmitted to the next operator in the path P by the processor 104.

Figure 6:
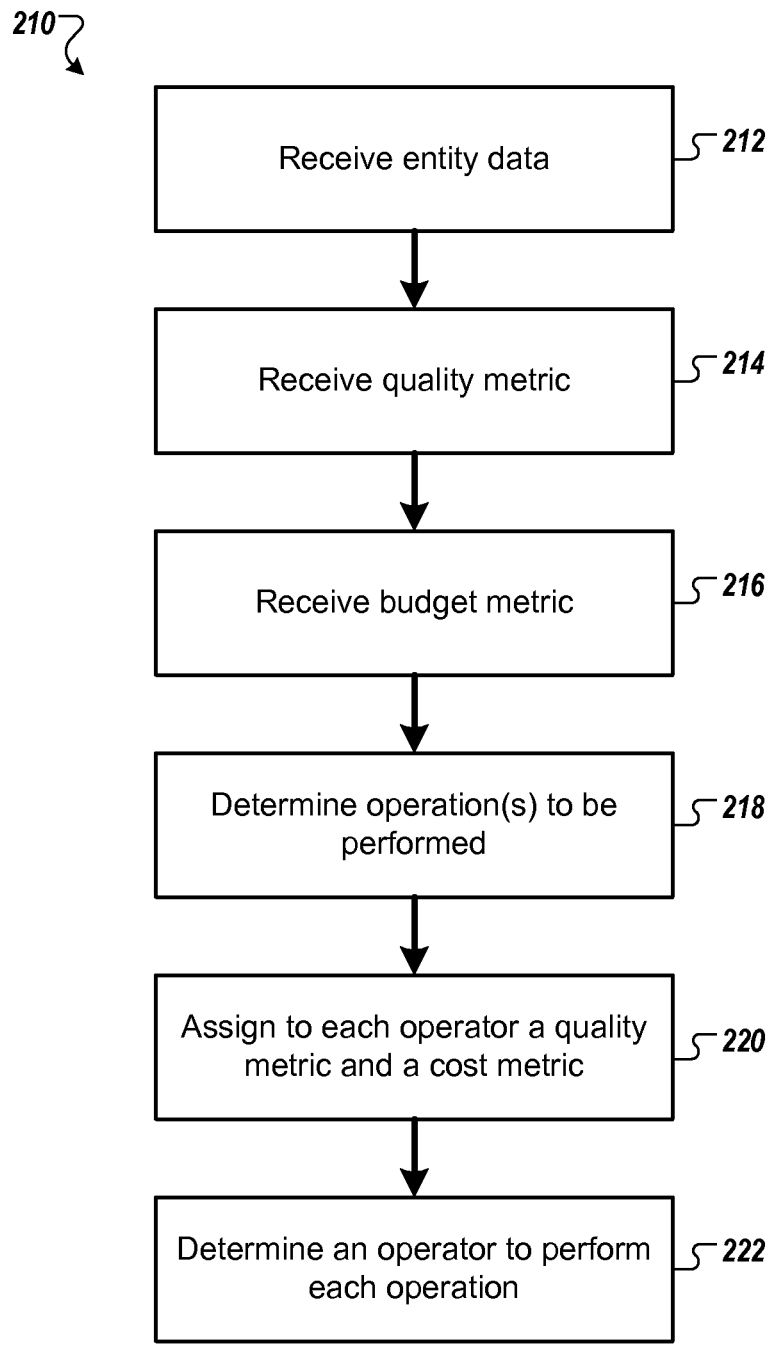
FIG. 6 is a flow chart of an exemplary method for optimizing a data integration process in accordance with some embodiments discussed herein.

FIG. 6 is a flow diagram of an exemplary method 210 for optimizing a data integration process. For convenience, the method 210 will be described with respect to a system that includes one or more computing devices and performs the method 210. Specifically, the method 210 will be described with respect to controlling a data integration process by the data integration system described with respect to FIG. 1.

In the exemplary method 210, the processor 104 receives entity data from one or more sources for each of a plurality of entities (block 212). The entity data represent attribute values for each of a plurality of attribute types. The processor 104 also receives a quality metric (i.e., a minimum quality level or a quality target) for each entity, for the plurality of entities, or both (block 214), and receives a budget metric (a budget maximum) for each entity, for the plurality of entities, or both (block 216). The processor 104 determines for each attribute type, one or more logical operations to be performed by one of a plurality of operators on the corresponding attribute value (block 218). Each of the operators is assigned a quality value (i.e., the quality associated with the operator) and a cost value (the cost of having the operator perform the operation) (block 220). The processor 104 selects for each operation an operator to perform the operation (block 222). The processor 104 makes the selection according to the received quality metric, the received budget metric, the assigned operator quality metrics, and the assigned operator budget metric.

Of course, it will be recognized that the techniques, methods, and systems described herein need not be limited to data integration systems, per se. Instead, the methods and system described may be applied to any data processing system that takes as input one (or more) "dirty" databases (or a stream of records) and produces a single "clean" database (or stream of records). Data integration represents but one notable application domain where the methods and systems described herein may be applied, but there are many more—e.g., processing social networking streams to find interesting stock market information, processing an employee database to find incorrect employee data, processing sensor data (e.g., RFID, remote sensors, etc) to infer something about the real world, etc.

Likewise, the method applies to any real-world entity. For example, a method and system according to present disclosure may process records related to people (e.g., employees, social network entries, etc.), records related to places (businesses, physical locations, houses, real property, etc.), record related to things (e.g., products, vehicles, etc.), and the like. It should be apparent in view of the disclosure that the attributes stored for each entity may vary according to the type of entity and/or according to the purpose for which the records are to be used. The entity weights, attribute weights, and other parameters may be similarly adjusted and/or varied according to the particular set of entities in questions and the intended use of the data.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 126 may include but is not limited to any combination of a LAN, a MAN, a WAN, a mobile, a wired or wireless network, a private network, or a virtual private network. Moreover, while only one workstation 102 is illustrated in FIG. 1 to simplify and clarify the description, it is understood that any number of workstations 102 are supported and can be in communication with the other workstations 130 and databases 132.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. The terms "orchestrate" and "orchestration" respectively may include, without limitation, the operations of "execute" and "execution."

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a data integration process control system for purposes of illustration only. One skilled in the art will readily recognize from the following discussion that alternative embodiments of the structures and methods illustrated herein may be employed without departing from the principles described herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

In particular, the following aspects are representative, but not exhaustive, of the contemplated embodiments:

1. A system for controlling a data integration process, the data integration process having as inputs data from multiple sources, processing the inputs to achieve at least a minimum quality for less than a maximum cost, and providing as an output a database storing data of at least the minimum quality, the system comprising:

a processor;

a memory device communicatively coupled to the processor;

a plurality of records $r_0$ to $r_i$ stored on the memory device, each record pertaining to an entity and including (1) a plurality of attributes, $a_0$ to $a_j$, (2) a plurality of values, each value (a) corresponding to one of the plurality of attributes, (b) received from one of the multiple sources, and (c) requiring one or more logical operations to be performed thereon during the data integration process, (3) a quality metric indicating the quality of the data associated with the record, and (4) a budget for the record;

an operator table stored on the memory device associating with each of a plurality of operators an operator quality and an operator cost, wherein each of the plurality of operators performs one or more of the logical operations;

an operator quality module executable by the processor to determine the operator quality for an operator and to associate the operator quality with the operator in the operator table; and an integration control module executable by the processor and operable to select an operator for each logical operation required for each attribute of each record, such that a quality value is achieved/maximized while staying within the budget.

2. The system of aspect 1, further comprising:

an operator graph defined by a plurality of nodes including a source node, a sink node, and at least one intermediate node, each node connected by one or more edges to another node, each node representing one of the plurality of operators and having as its input an edge entering the node and as its output an edge leaving the node;

and wherein the integration control module is operable to choose a path through the operator graph that maximizes quality while not exceeding the budget for the record.

3. The system of aspect 1 or aspect 2, wherein the integration control module is operable to determine a cost for each path through the operator graph and to select for each budget the path that maximizes quality.

4. The system of any of aspects 1 to 3, wherein the quality, Q, of a record, $r_x$, is calculated by the equation:

$$Q(r_x) = \sum_{y=0}^{j} Q(r_x a_y) = \sum_{y=0}^{j} Q(O_{x_{a_y}})$$

where:

$Q(r_x)$ is the quality of the record $r_x$, $$O_{x_{a_y}}$$

is the operator selected to perform the logical operation associated with the attribute $a_y$ for the record $r_x$, and $$Q(O_{x_{a_y}})$$

is the quality associated with the operator $$O_{x_{a_y}}.$$

5. The system of any one of aspects 1 to 4, further comprising an attribute array associating with each of the plurality of attributes an attribute weight.

6. The system of any one of aspects 1 to 5, further comprising an entity array associating with each of the entities an entity weight.

7. The system of any one of aspects 1 to 6, wherein the quality, Q, of a record, $r_x$, is calculated by the equation:

$$Q(r_x) = \sum_{y=0}^{j} Q(O_{x_{a_y}}) E(r_x) A(a_y)$$

where:

$Q(r_x)$ is the quality of the record $r_x$, $$O_{x_{a_y}}$$

is the operator selected to perform the logical operation associated with the attribute $a_y$ for the record $r_x$, $$Q(O_{x_{a_y}})$$

is the quality associated with the operator $$O_{x_{a_y}},$$

$A(a_y)$ is the attribute weight associated with the attribute $a_y$, and $E(r_x)$ is the entity weight associated with the entity of the record $r_x$.

8. The system of any one of aspects 1 to 7, further comprising a uniqueness array associating with each of the entities a uniqueness weight.

9. The system of any one of aspects 1 to 8, wherein the quality, Q, of a record, $r_x$, is calculated by the equation:

$$Q(r_x) = \sum_{y=0}^{j} Q(O_{x_{a_y}})E(r_x)A(a_y)U(r_x)$$

where:

$Q(r_x)$ is the quality of the record $r_x$, $O_{x_{a_y}}$ is the operator selected to perform the logical operation associated with the attribute $a_y$ for the record $r_x$, $Q(O_{x_{a_y}})$ is the quality associated with the operator $O_{x_{a_y}}$, $A(a_y)$ is the attribute weight associated with the attribute $a_y$,
$U(r_x)$ is the uniqueness weight associated with the entity of $r_x$, and
$E(r_x)$ is the entity weight associated with the entity of the record $r_x$.

10. The system of any one of aspects 1 to 9, wherein the quality, Q, of the database,
D, is calculated by the equation:

$$Q(D) = \sum_{x=0}^{i} Q(r_x)$$

where:
Q(D) is the quality of the database D, and
$Q(r_x)$ is the quality of the record $r_x$.

11. The system of any one of aspects 1 to 10, wherein the operator quality module includes an input receiving data from an oracle.

12. A method of data integration, the method comprising:
receiving in a processor, from a plurality of sources, for each of a plurality of entities, data representing attribute values for each of a plurality of attributes;
receiving a quality metric for each entity, for the plurality of entities, or both;
receiving a budget metric for each entity, for the plurality of entities, or both;
determining, for each of the attributes, one or more logical operations to be performed by one of a plurality of operators on the corresponding attribute value;
assigning to each of the plurality of operators an operator quality metric and an operator cost metric;
determining with the processor a selection, for each of the one or more logical operations for each of the attributes of each of the entities, of an operator to perform the logical operation, the selection determined according to the received quality metric, the received budget metric, the assigned operator quality metrics, and the assigned operator budget metrics;
storing in a memory coupled to the processor, for each of the one or more logical operations for each of the attributes of each of the entities, a corresponding output value from the corresponding selected operator; and
storing in a database a record for each of the entities, the record including each of the output values and having associated with it a record quality and a record cost.

13. The method of aspect 12, wherein selecting, for each of the one or more logical operations for each of the attributes of each of the entities, an operator to perform the logical operation comprises:
defining an operator graph having a plurality of nodes including a source node, a sink node, and at least one intermediate node, each node connected by one or more directed edges to another node, each node representing one of the plurality of operators and having as its input an edge entering the node and as its output an edge leaving the node;
selecting a path through the operator graph that maximizes quality while keeping the record cost at or below the record budget.

14. The method of aspect 12 or aspect 13, wherein selecting a path through the operator graph comprises determining a cost for each path through the operator graph.

15. The method of any one of aspects 12 to 14, wherein the record quality is calculated by the equation:

$$Q(r_x) = \sum_{y=0}^{j} Q(r_x a_y) = \sum_{y=0}^{j} Q(O_{x_{a_y}})$$

where:
$Q(r_x)$ is the quality of the record $r_x$, $O_{x_{a_y}}$ is the operator selected to perform the logical operation associated with the attribute $a_y$ for the record $r_x$, and $Q(O_{x_{a_y}})$ is the quality associated with the operator $O_{x_{a_y}}$.

16. The method of any one of aspects 12 to 15, further comprising storing in an attribute array a plurality of attribute weights, each attribute weight associated with one of the plurality of attributes.

17. The method of any one of aspects 12 to 16, further comprising storing in an entity array a plurality of entity weights, each entity weight associated with one of the plurality of entities.

18. The method of any one of aspects 12 to 17, wherein the record quality is calculated by the equation:

$$Q(r_x) = \sum_{y=0}^{j} Q(O_{x_{a_y}}) E(r_x) A(a_y)$$

where:

$Q(r_x)$ is the quality of the record $r_x$, $O_{x_{a_y}}$ is the operator selected to perform the logical operation associated with the attribute $a_y$ for the record $r_x$, $Q(O_{x_{a_y}})$ is the quality associated with the operator $O_{x_{a_y}}$, $A(a_y)$ is the attribute weight associated with the attribute $a_y$, and $E(r_x)$ is the entity weight associated with the entity of the record $r_x$.

19. The method of any one of aspects 12 to 18, further comprising storing in a uniqueness array a plurality of uniqueness weights, each uniqueness weight associated with one of the plurality of entities.

20. The method of any one of aspects 12 to 19, wherein the record quality is calculated by the equation:

$$Q(r_x) = \sum_{y=0}^{j} Q(O_{x_{a_y}}) E(r_x) A(a_y) U(r_x)$$

where:

$Q(r_x)$ is the quality of the record $r_x$, $O_{x_{a_y}}$ is the operator selected to perform the logical operation associated with the attribute $a_y$ for the record $r_x$, $Q(O_{x_{a_y}})$ is the quality associated with the operator $O_{x_{a_y}}$, $A(a_y)$ is the attribute weight associated with the attribute $a_y$,
$U(r_x)$ is the uniqueness weight associated with the entity of $r_x$, and
$E(r_x)$ is the entity weight associated with the entity of the record $r_x$.

21. The method of any one of aspects 12 to 20, wherein database quality is calculated by the equation:

$$Q(D) = \sum_{x=0}^{i} Q(r_x)$$

where:

$Q(D)$ is the quality of the database D, and
$Q(r_x)$ is the quality of the record $r_x$.

22. The method of any one of aspects 12 to 21, wherein assigning to each of the plurality of operators an operator quality metric comprises receiving information from an oracle.

23. A system or method according to any one of the preceding aspects wherein cost is minimized while achieving at least a minimum quality value.

24. A system or method according to any one of aspects 1 to 22, wherein quality is maximized within the budget.

That which is claimed:

1. A computer-implemented method, comprising:
receiving a data record comprising attributes;
generating, for the data record, an operator graph comprising nodes and edges, wherein each node is an operator node that represents an operator for implementing at least one logical operation being performed on at least one of the attributes, wherein each operator node comprises operator metrics that include at least one of an operator cost metric and an operator quality metric, and wherein each edge between a pair of operator nodes corresponds to data movement between the operator nodes;
generating an optimized operator graph for the data record based on the operator graph, wherein the optimized operator graph comprises a source node that represents a first operator node that receives the data record as input to the optimized operator graph and a sink node that represents a second operator node that produces an output from the optimized operator graph; and
determining a best path from the source node to the sink node within the optimized operator graph, wherein the best path includes a subset of the operator nodes within the optimized operator graph, and wherein the determining the best path is based in part on at least one of the operator metrics associated with each respective operator node; and
in an instance in which the determining the best path further comprises using a cost budget associated with the data record,
receiving the cost budget associated with the data record;
receiving a mapping between each cost budget of a set of cost budgets and a best path respectively associated with each cost budget; and
determining the best path by selecting from the mapping the best path associated with the received cost budget; and
in an instance in which the received mapping is a hash table, generating the hash table by:
receiving the set of cost budgets;
determining a set of possible paths between the source node and the sink node within the optimized operator graph, wherein each possible path P includes a respective subset of the operator nodes;
calculating a respective quality of the path output Q(P) and a respective path cost C(P) for each possible path P of the set of possible paths, wherein the path cost C(P) is calculated using operator cost metrics respectively associated with each of the subset of the operator nodes; and for each cost budget in the set of cost budgets,
selecting a subset of the possible paths between the source node and the sink node, wherein each possible path P in the selected subset has a calculated C(P) that is less than or equal to the cost budget;
selecting a best path from the subset of possible paths, wherein the best path has the maximum calculated Q(P) of the subset of possible paths; and
creating a hashtable entry associating the cost budget with the selected best path.

2. The method of claim 1, further comprising:
orchestrating a data integration task for the data record based on the determined best path.

3. The method of claim 1, wherein the optimized operator graph is a directed line graph.

4. The method of claim 1, wherein the optimized operator graph is a directed acyclic graph.

5. The method of claim 1, wherein the mapping is a two-dimensional array of elements, wherein each element represents a cost budget and a respective best path calculated for the cost budget, and wherein generating the array comprises:
receiving the set of cost budgets;
for each cost budget in the set of cost budgets,
calculating a best path P from the source node to the sink node by determining a subset of operator nodes for which the quality of the path output Q(P) is maximized and the path cost C(P) is less than or equal to the cost budget; and
assigning the cost budget and the best path P to a respective element in the array.

6. The method of claim 1, wherein an operator cost metric associated with an operator node is calculated based on consensus.

7. The method of claim 6, wherein the consensus is crowd sourcing.

8. The method of claim 1, wherein an attribute associated with the data record is a quality metric that is calculated based in part on the uniqueness of the data record.

9. The method of claim 1, wherein the quality metric attribute associated with the data record is calculated based in part on a quality metric respectively associated with at least one of the attributes.

10. The method of claim 9, wherein the quality metric respectively associated with the attribute is weighted.

11. A computer program product, stored on a non-transitory computer readable medium, comprising instructions that when executed on one or more computers cause the one or more computers to perform operations comprising:
receiving a data record comprising attributes;
generating, for the data record, an operator graph comprising nodes and edges, wherein each node is an operator node that represents an operator for implementing at least one logical operation being performed on at least one of the attributes, wherein each operator node comprises operator metrics that include at least one of an operator cost metric and an operator quality metric, and wherein each edge between a pair of operator nodes corresponds to data movement between the operator nodes;
generating an optimized operator graph for the data record based on the operator graph, wherein the optimized operator graph comprises a source node that represents a first operator node that receives the data record as input to the optimized operator graph and a sink node that represents a second operator node that produces an output from the optimized operator graph; and
determining a best path from the source node to the sink node within the optimized operator graph, wherein the best path includes a subset of the operator nodes within the optimized operator graph, and wherein the determining the best path is based in part on at least one of the operator metrics associated with each respective operator node; and
in an instance in which the determining the best path further comprises using a cost budget associated with the data record,
receiving the cost budget associated with the data record;
receiving a mapping between each cost budget of a set of cost budgets and a best path respectively associated with each cost budget; and
determining the best path by selecting from the mapping the best path associated with the received cost budget; and
in an instance in which the received mapping is a hash table, generating the hash table by:
receiving the set of cost budgets;
determining a set of possible paths between the source node and the sink node within the optimized operator graph, wherein each possible path P includes a respective subset of the operator nodes;
calculating a respective quality of the path output Q(P) and a respective path cost C(P) for each possible path P of the set of possible paths, wherein the path cost C(P) is calculated using operator cost metrics respectively associated with each of the subset of the operator nodes; and
for each cost budget in the set of cost budgets,
selecting a subset of the possible paths between the source node and the sink node, wherein each possible path P in the selected subset has a calculated C(P) that is less than or equal to the cost budget;
selecting a best path from the subset of possible paths, wherein the best path has the maximum calculated Q(P) of the subset of possible paths; and
creating a hashtable entry associating the cost budget with the selected best path.

12. The computer program product of claim 11, wherein the operations further comprise:
orchestrating a data integration task for the data record based on the determined best path.

13. The computer program product of claim 11, wherein the optimized operator graph is a directed line graph.

14. The computer program product of claim 11, wherein the optimized operator graph is a directed acyclic graph.

15. The computer program product of claim 11, wherein the mapping is a two-dimensional array of elements, wherein each element represents a cost budget and a respective best path calculated for the cost budget, and wherein generating the array comprises:
receiving the set of cost budgets;
for each cost budget in the set of cost budgets,
calculating a best path P from the source node to the sink node by determining a subset of operator nodes for which the quality of the path output Q(P) is maximized and the path cost C(P) is less than or equal to the cost budget; and
assigning the cost budget and the best path P to a respective element in the array.

16. The computer program product of claim 11, wherein an operator cost metric associated with an operator node is calculated based on consensus.

17. The computer program product of claim 16, wherein the consensus is crowd sourcing.

18. The computer program product of claim 11, wherein an attribute associated with the data record is a quality metric that is calculated based in part on the uniqueness of the data record.

19. The computer program product of claim 11, wherein the quality metric attribute associated with the data record is calculated based in part on a quality metric respectively associated with at least one of the attributes.

20. The computer program product of claim 19, wherein the quality metric respectively associated with the attribute is weighted.

21. A system comprising:
one or more computers and one or more storage devices storing instructions that are operable, when executed by the one or more computers, to cause the one or more computers to perform operations comprising:
receiving a data record comprising attributes;
generating, for the data record, an operator graph comprising nodes and edges, wherein each node is an operator node that represents an operator for implementing at least one logical operation being performed on at least one of the attributes, wherein each operator node comprises operator metrics that include at least one of an operator cost metric and an operator quality metric, and wherein each edge between a pair of operator nodes corresponds to data movement between the operator nodes;
generating an optimized operator graph for the data record based on the operator graph, wherein the optimized operator graph comprises a source node that represents a first operator node that receives the data record as input to the optimized operator graph and a sink node that represents a second operator node that produces an output from the optimized operator graph; and
determining a best path from the source node to the sink node within the optimized operator graph, wherein the best path includes a subset of the operator nodes within the optimized operator graph, and wherein the determining the best path is based in part on at least one of the operator metrics associated with each respective operator node; and
in an instance in which the determining the best path further comprises using a cost budget associated with the data record,
receiving the cost budget associated with the data record;
receiving a mapping between each cost budget of a set of cost budgets and a best path respectively associated with each cost budget; and
determining the best path by selecting from the mapping the best path associated with the received cost budget; and
in an instance in which the received mapping is a hash table, generating the hash table by:
receiving the set of cost budgets;
determining a set of possible paths between the source node and the sink node within the optimized operator graph, wherein each possible path P includes a respective subset of the operator nodes;
calculating a respective quality of the path output Q(P) and a respective path cost C(P) for each possible path P of the set of possible paths, wherein the path cost C(P) is calculated using operator cost metrics respectively associated with each of the subset of the operator nodes; and
for each cost budget in the set of cost budgets,
selecting a subset of the possible paths between the source node and the sink node, wherein each possible path P in the selected subset has a calculated C(P) that is less than or equal to the cost budget;
selecting a best path from the subset of possible paths, wherein the best path has the maximum calculated Q(P) of the subset of possible paths; and
creating a hashtable entry associating the cost budget with the selected best path.

22. The system of claim 21, wherein the system further comprises a declarative interface, configured to receive input data associated with the data record, wherein the input data represent at least one of a cost budget and a quality metric.

23. The system of claim 22, wherein the declarative interface is configured to receive input data representing a quality metric respectively associated with at least one of the attributes.

24. The system of claim 22, wherein the declarative interface is configured to receive input data representing at least one component of the operator graph.

25. The system of claim 21, wherein the system further comprises a control module, configured to orchestrate a data integration task for the data record based on the selected best path.

26. The system of claim 21, wherein the system further comprises a crowd-sourcing platform, configured to calculate a cost metric associated with an operator node based on consensus.

27. A computer program product, stored on a non-transitory computer readable medium, comprising instructions that when executed on one or more computers cause the one or more computers to perform operations comprising:
receiving a business data record comprising attributes, wherein the business data record represents a business entity, and wherein the attributes include at least one of business name, business location, business neighborhood, business category, business web site, description of business services offered, and business promotions offered;
generating, for the business data record, an operator graph comprising nodes and edges, wherein each node is an operator node that represents an operator for implementing at least one logical operation being performed on at least one of the attributes, wherein each operator node comprises operator metrics that include at least one of an operator cost metric and an operator quality metric, and wherein each edge between a pair of operator nodes corresponds to data movement between the operator nodes;
generating an optimized operator graph for the business data record based on the operator graph, wherein the optimized operator graph comprises a source node that represents a first operator node that receives the business data record as input to the optimized operator graph and a sink node that represents a second operator node that produces an output from the optimized operator graph; and
determining a best path from the source node to the sink node within the optimized operator graph, wherein the best path includes a subset of the operator nodes within the optimized operator graph, and wherein the determining the best path is based in part on at least one of the operator metrics associated with each respective operator node; and in an instance in which the determining the best path further comprises using a cost budget associated with the business data record, receiving the cost budget associated with the business data record;

receiving a mapping between each cost budget of a set of cost budgets and a best path respectively associated with each cost budget; and determining the best path by selecting from the mapping the best path associated with the received cost budget; and in an instance in which the received mapping is a hash table, generating the hash table by:

receiving the set of cost budgets;

determining a set of possible paths between the source node and the sink node within the optimized operator graph, wherein each possible path P includes a respective subset of the operator nodes;

calculating a respective quality of the path output $Q(P)$ and a respective path cost $C(P)$ for each possible path P of the set of possible paths, wherein the path cost $C(P)$ is calculated using operator cost metrics respectively associated with each of the subset of the operator nodes; and for each cost budget in the set of cost budgets, selecting a subset of the possible paths between the source node and the sink node, wherein each possible path P in the selected subset has a calculated $C(P)$ that is less than or equal to the cost budget;

selecting a best path from the subset of possible paths, wherein the best path has the maximum calculated $Q(P)$ of the subset of possible paths; and creating a hashtable entry associating the cost budget with the selected best path.

28. The computer program product of claim 27, further comprising:

orchestrating a data integration task for the data record based on the determined best path.

* * * * *